(12) United States Patent
Javan Roshtkhari et al.

(10) Patent No.: US 11,176,706 B2
(45) Date of Patent: Nov. 16, 2021

(54) SYSTEMS AND METHODS FOR AUTOMATED CAMERA CALIBRATION

(71) Applicant: Sportlogiq Inc., Montreal (CA)

(72) Inventors: Mehrsan Javan Roshtkhari, Montreal (CA); Juan Camilo Gamboa Higuera, Montreal (CA); Gregory Lewis Dudek, Montreal (CA)

(73) Assignee: Sportlogiq Inc., Montreal (CA)

( * ) Notice: Subject to any disclaimer, the term of this patent is extended or adjusted under 35 U.S.C. 154(b) by 41 days.

(21) Appl. No.: 16/049,546

(22) Filed: Jul. 30, 2018

(65) Prior Publication Data

US 2018/0336704 A1    Nov. 22, 2018

Related U.S. Application Data

(63) Continuation of application No. PCT/CA2017/050117, filed on Feb. 2, 2017.
(Continued)

(51) Int. Cl.
*G06T 7/80* (2017.01)
*H04N 17/00* (2006.01)
(Continued)

(52) U.S. Cl.
CPC .............. *G06T 7/80* (2017.01); *G03B 35/00* (2013.01); *G03B 43/00* (2013.01); *G06T 7/13* (2017.01);
(Continued)

(58) Field of Classification Search
CPC .... G06T 7/80; G06T 7/85; G06T 7/60; G06T 7/248; G06T 7/285; G06T 7/55;
(Continued)

(56) References Cited

U.S. PATENT DOCUMENTS 6,137,491 A     10/2000  Szeliski
6,178,272 B1 *   1/2001  Segman ............... G06T 3/0018
                                            382/298
(Continued)

OTHER PUBLICATIONS

P. Carr, Y. Sheikh and I. Matthews, "Point-less calibration: Camera parameters from gradient-based alignment to edge images," 2012 IEEE Workshop on the Applications of Computer Vision (WACV), Breckenridge, CO, USA, 2012, pp. 377-384 (Year: 2012).*
(Continued)

*Primary Examiner* — Daniel Chang
(74) *Attorney, Agent, or Firm* — CPST Intellectual Property Inc.; Brett J. Slaney

(57) ABSTRACT

A system and method for calibrating and re-calibrating an imaging device. The image device includes at least one varying intrinsic or extrinsic parameter value based on a view of 3D shapes and a 2D template therefor. The method and system are operable to receive a sequence of images from the imaging device, wherein a planar surface with known geometry is observable from the sequence of images; perform an initial estimation of a set of camera parameters for a given image frame; perform a parameter adjustment operation to minimize a dissimilarity between the template and the sequence of images; perform a parameter adjustment operation to maximize similarities in either the camera's coordinate system or the template's coordinate system; and update an adaptive world template to incorporate an additional stable point from the observed images to the template.

29 Claims, 8 Drawing Sheets

Related U.S. Application Data

(60) Provisional application No. 62/290,558, filed on Feb. 3, 2016.

(51) Int. Cl.
*G03B 35/00* (2021.01)
*G03B 43/00* (2021.01)
*G06T 7/62* (2017.01)
*G06T 7/13* (2017.01)
*G06T 7/33* (2017.01)

(52) U.S. Cl.
CPC .............. *G06T 7/337* (2017.01); *G06T 7/62* (2017.01); *H04N 17/002* (2013.01); *G06T 2207/20076* (2013.01); *G06T 2207/20084* (2013.01); *G06T 2207/30204* (2013.01); *G06T 2207/30228* (2013.01)

(58) Field of Classification Search
CPC ... G06T 7/30; G06T 7/33; G06T 2207/30221; G06T 2207/30228; G06T 7/337; G06T 2207/10012; G06T 7/593; G06T 15/20; G06T 7/74; G06T 7/246; G06T 2211/424; G06T 7/73; G06T 7/174; G06T 11/003; G06T 2207/302228; G06T 7/12; G06T 7/13; H04N 13/246; H04N 17/002; H04N 5/247; H04N 13/111; G06K 9/46; G06K 9/4604; G06K 9/6211; G06K 9/52; G06K 9/6203
USPC .............................. 348/47–48; 382/154, 294
See application file for complete search history.

(56) References Cited

U.S. PATENT DOCUMENTS

| | | | |
|---|---|---|---|
| 8,249,361 B1* | 8/2012 | Steffens | G06K 9/6215 382/209 |
| 8,385,658 B2* | 2/2013 | Elangovan | H04N 5/265 382/216 |
| 9,462,263 B2* | 10/2016 | BenMoshe | H04N 17/002 |
| 9,866,820 B1* | 1/2018 | Agrawal | H04N 13/239 |
| 10,091,418 B2* | 10/2018 | Alvarado-Moya | H04N 5/2256 |
| 2002/0191862 A1* | 12/2002 | Neumann | G06T 7/80 382/284 |
| 2008/0085061 A1* | 4/2008 | Arici | H04N 19/86 382/268 |
| 2008/0291282 A1 | 11/2008 | Fitzgibbon et al. | |
| 2009/0232358 A1* | 9/2009 | Cross | G06K 9/00818 382/103 |
| 2012/0180084 A1 | 7/2012 | Huang et al. | |
| 2013/0155058 A1* | 6/2013 | Golparvar-Fard | G06T 17/00 345/419 |
| 2013/0176392 A1 | 7/2013 | Carr et al. | |
| 2013/0287318 A1 | 10/2013 | Shechtman et al. | |
| 2014/0118557 A1* | 5/2014 | Lee | H04N 17/002 348/175 |
| 2014/0168378 A1* | 6/2014 | Hall | G06F 3/0425 348/47 |
| 2014/0270540 A1* | 9/2014 | Spector | G06T 7/579 382/199 |
| 2015/0093018 A1* | 4/2015 | Macciola | G06T 5/006 382/154 |
| 2015/0093042 A1 | 4/2015 | Zhu et al. | |
| 2015/0110372 A1* | 4/2015 | Solanki | G16Z 99/00 382/130 |
| 2015/0178587 A1* | 6/2015 | Chamaret | G06T 5/40 382/164 |
| 2015/0254872 A1* | 9/2015 | de Almeida Barreto | G06T 11/001 382/103 |
| 2016/0012643 A1* | 1/2016 | Kezele | G02B 27/0093 345/633 |
| 2016/0127705 A1* | 5/2016 | Urban | G06K 9/4609 382/164 |
| 2016/0284075 A1* | 9/2016 | Phan | G06K 9/00664 |
| 2016/0343136 A1* | 11/2016 | Heidi | G06T 7/80 |
| 2017/0228864 A1* | 8/2017 | Liu | G06T 7/80 |
| 2018/0020205 A1* | 1/2018 | Aflalo | G06T 7/593 |

OTHER PUBLICATIONS

Chan A., International Search Report from corresponding PCT Application No. PCT/CA2017/050117; search completed Apr. 19, 2017.

Danny, J.; "A Computational Approach to Edge Detection"; Pattern Analysis and Machine Intelligence, IEEE Transactions on; PAMI-8(6); Nov. 1986; pp. 679-698.

Devernay, F. et al.; "Straight lines have to be straight: automatic calibration and removal of distortion from scenes of structured enviroments"; Machine Vision and Applications; 13(1); 2001; pp. 14-24.

Elfes, A.; "Using Occupancy Grids for Mobile Robot Perception and Navigation"; Computer; 22(6); 1989; pp. 46-57.

Fischler, M.A. et al.; "Random Sample Consensus: A Paradigm for Model Fitting with Applications to Image Analysis and Automated Cartography"; Communications of the ACM; 24(6); Jun. 1981; pp. 381-395.

Girdhar, Y. et al.; "Efficient on-line data summarization using extremum summaries"; IEEE International Conference an Robotics and Automation (ICRA), Saint Paul, Minnesota; May 2012.

Gupta, A. et al.; Using Line and Ellipse Features for Rectification of Broadcast Hockey Video; Computer and Robot Vision (CRV), Canadian Conference on; 2011; pp. 32-39.

Hayet, J.-B. et al.; "On-Line Rectification of Sport Sequences with Moving Cameras"; Springer Berlin Heidelberg; 2007; http://dx.doi.org/10.1007/978-3-540-76631-5_70.

Hess, R. et al.; "Improved Video Registration using Non-Distinctive Local Image Features"; Computer Vision and Pattern Recognition, 2007 (CVPR '07) IEEE Conference on; 2007; pp. 1-8.

Leutenegger, M. et al.; "BRISK: Binary Robust Invariant Scalable Keypoints"; Computer Vision (ICCV), 2011 IEEE International Conference on; 2011; pp. 2548-2555.

Okuma, K. et al.; "Automatic Rectification of Long Image Sequences"; Asian Conference on Computer Vision; 9; 2004.

Rublee, V. et al.; "ORB: An efficient alternative to SIFT or SURF"; Computer Vision (ICCV), 2011 IEEE International Conference on; 2011; pp. 2564-2571.

Tomasi, C. et al.; Detection and tracking of point features; Technical Report CMU-CS-91-132; School of Computer Science, Carnegie Mellon Univ. Pittsburgh; 1991.

Tsai, R. Y.; "A Versatile Camera Calibration Technique for High-Accuracy 3D Machine Vision Metrology Using off-the-Shelf TV Cameras and Lenses"; Robotics and Automation, IEEE Journal of; 3(4); 1987; pp. 323-344.

Viola, P. et al.; "Alignment by Maximization of Mutual Information"; International Journal of Computer Vision; 24(2); 1997; pp. 137-154.

Zhang, Z.; "A Flexible New Technique for Camera Calibration"; Pattern Analysis and Machine Intelligence, IEEE Transactions on; 22(11); 2000; pp. 1330-1334.

Zhang, Z.; "Iterative Point Matching for Registration of Free-Form Curves and Surfaces"; International Journal of Computer Vision; 13(2); 1994; pp. 119-152; http://dx.doi.org/10.1007/BF01427149.

Farin D. et al.; "Robust Camera Calibration for Sport Videos using Court Models"; Visual Communications and Image Processing; vol. 5307; Jan. 1, 2004; pp. 80-91.

Thomas, G.; "Real-time camera tracking using sports pitch markings"; Journal of Reas-Time Image Processing; vol. 2, No. 2-3, Oct. 10, 2007; pp. 117-132.

Kim, H. et al.; "Soccer Video Mosaicing using Self-Calibration and Line Tracking"; Proceedings of the 15th International Conference on Pattern Recognition (ICPR); Barcelona, Spain; Sep. 3-7, 2000; IEEE Computer Society; vol. 1, Sep. 3-7, 2000; pp. 592-595.

(56) References Cited

OTHER PUBLICATIONS

Engels, A.; Supplementary Search Report from corresponding European Application No. 17746676.0; search completed Aug. 7, 2019.

* cited by examiner

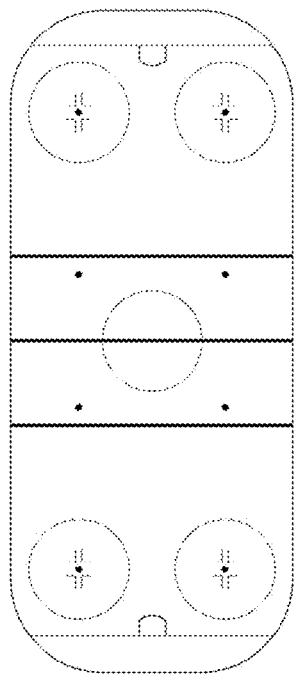
FIG. 4(a) Real-world template
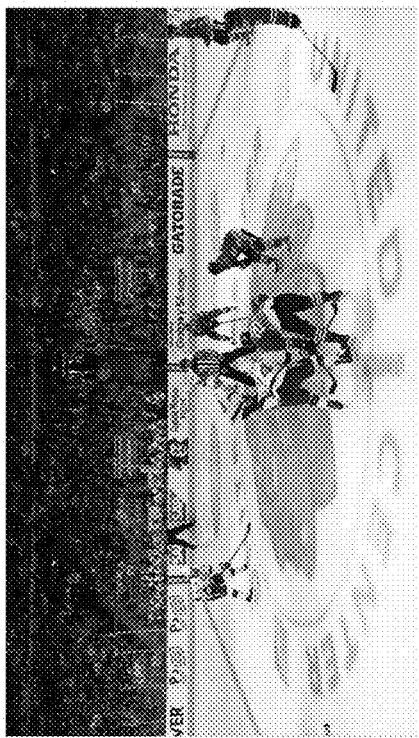
FIG. 4(b) Frame from broadcast video
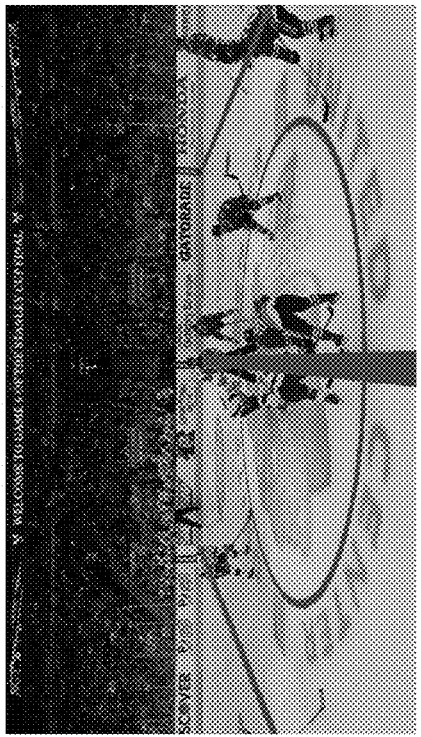
FIG. 4(c) Warped template overlayed over video frame
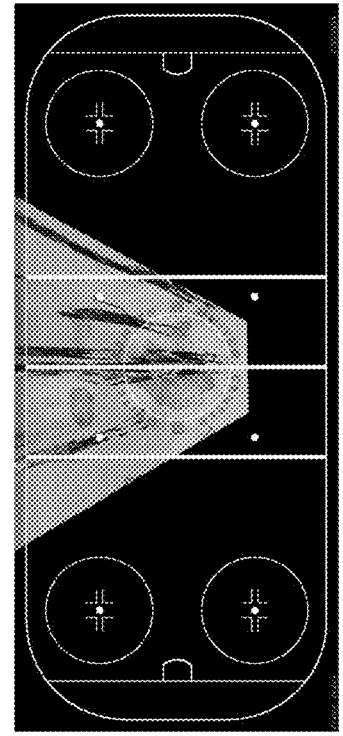
FIG. 4(d) Warped video frame overlayed over template

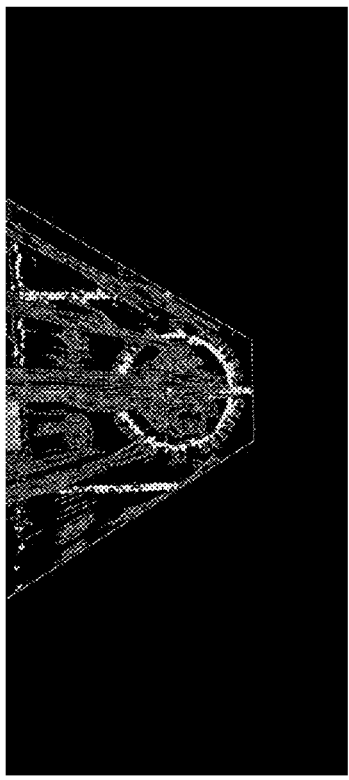
FIG. 5(a): Edge detections, and selected feature points, from the warped video frame
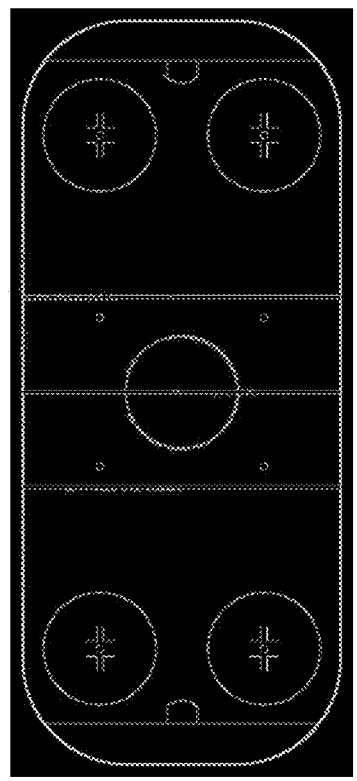
FIG. 5(b): Corresponding point locations in the original template

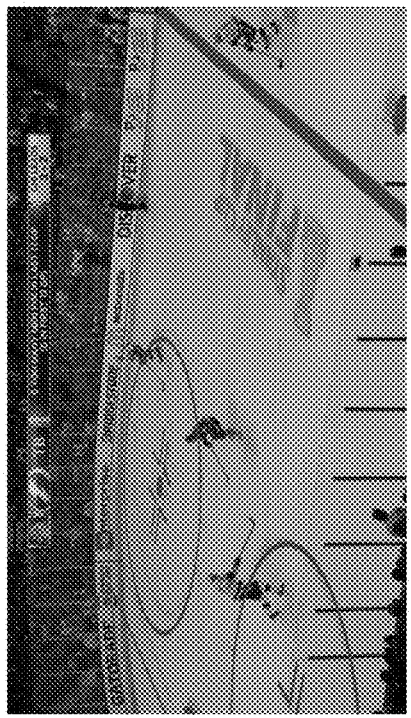
FIG. 7(a) Incorrect alignment, which results in low mutual information (MI = 0.0688505)
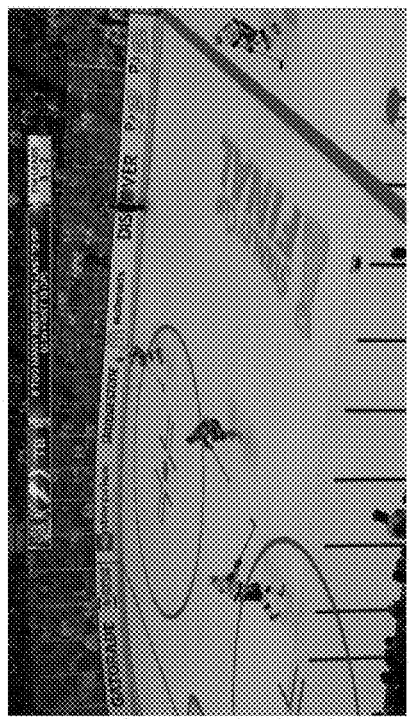
FIG. 7(b) Correct alignment, which results in high mutual information (MI = 0.141602)

SYSTEMS AND METHODS FOR AUTOMATED CAMERA CALIBRATION

CROSS-REFERENCE TO RELATED APPLICATION(S)

This application is a continuation of PCT Application No. PCT/CA2017/050117 filed on Feb. 2, 2017 which claims priority to U.S. Provisional Patent Application No. 62/290,558 filed on Feb. 3, 2016, both incorporated herein by reference.

TECHNICAL FIELD

The following relates to systems and methods for automated camera calibration.

DESCRIPTION OF THE RELATED ART

Camera calibration is used for estimating the parameters of a geometric camera model, which establishes a relationship between three-dimensional points in a scene with two-dimensional points in an image. Estimating these parameters is often considered a fundamental task in computer vision research. Any vision application which relies on computing metric information from images requires the intrinsic (properties of the lens and capture device) and extrinsic (position and orientation) camera parameters to be known.

Decades of research on this topic have produced a diverse set of approaches and a rich collection of practical, robust, and accurate calibration algorithms. In practice, the majority of camera calibration algorithms rely on capturing images of reference objects to estimate camera parameters. Reference objects are usually a specifically designed calibration object with known dimensions and 3D geometrical information, which is referred to as a calibration pattern. A calibration pattern can be a 3D object, and 2D plane or a 1D line. The camera parameters are being estimated using different views of the calibration pattern by moving the camera on the calibration pattern [20] [16]. In the standard camera calibration algorithms, the correspondences between images and geometric features of the real world are identified, to enable estimating the unknown camera parameters.

Existing methods to calibrate cameras and estimate planar homography transformations using a calibration pattern are found to require finding correspondence between the images and the calibration pattern. The correspondence can be point, line or conical correspondences between the observed image of the calibration object and the actual calibration pattern [8]. Given the correspondences and a parametrized camera model which establishes a relationship between the images and the real-world, the camera parameters can be estimated using different techniques. Usually the camera projection parameters are estimated through an optimization procedure in which the re-projection error, i.e. the difference between re-projected world points and their corresponding image points is minimized. These type of methods usually require enough good point correspondences to obtain the camera parameters.

Detecting and localizing image features (points, lines, conics) that correspond to an arbitrary object across multiple images can be a challenging problem. Current imaging devices are susceptible to noise, blur, distortion, and illumination variations, which impacts the ability of recognizing a feature in the image. In order to automatically find points/lines/curves correspondences, it is considered important to design calibration patterns which have image features that are easily identifiable using current machine vision techniques. A planar checkerboard pattern (Tsai grid) is a commonly used calibration pattern [16] [18]. Employing such calibration patterns for outdoor cameras which are typically far from the ground plane could be impractical, because the size of the pattern might be in the order of couple of meters to be reliably detected. A particular example of such a situation in which the use of a calibration pattern is not practical is a broadcast camera showing a sporting event.

Accordingly, within the prior art, the standard approach for finding pairs of correspondences is to extract and match key image landmarks by finding image interest-points. The drawback associated with these image-landmark based calibration methods is that they rely on finding good correspondences between images and the real-world geometry. Unless the real-world object with known geometry has easily identifiable landmarks, point correspondences usually leads to unreliable results. This is one of the reasons that the Tsai grid has been found to be a popular calibration pattern because the corners of a checkerboard pattern can be easily identified in an image. Contrary to an image feature pair correspondence-based method, there are holistic image based alignment techniques that try to match an image to a template without using point landmarks. Those methods generally consider the whole image as a single entity and try to minimize an error measurement between the image and the projection of the real-world template to the image coordinates in order to find camera projection parameters. In order to achieve a convergence to the actual camera parameters, these algorithms require to start from an initial point which is close enough to an actual solution.

Another problem arises when the camera parameters are changing over time (e.g. the lens focal length and camera orientation in broadcast camera covering a sport event) it is required to re-calibrate the camera and estimate the new sets of camera parameters. The calibration typically cannot be done using conventional techniques and it is required to estimate camera parameters at every frame based on the new observations. Therefore, one needs to re-calibrate the camera either using the point-landmarks and point correspondences between observations, or doing a holistic image registration to estimate camera parameters.

To date, most of the reported approaches for camera calibration rely on using multiple images of the same calibration pattern by the same camera observed from a few different orientations [9]. The calibration is usually done using sparse image features or dense pixel matching. Although these techniques are widely used in computer vision systems, it has been found to not be easy to (re-)estimate camera parameters if they are constantly changing over time. Some ambiguities such as the one present between the camera focal length and the motion along the camera's optical axis can only be resolved if the same calibration pattern at every new observation is employed. The way that the camera re-calibration is usually done under camera motion, is to perform classical calibration methods beforehand, and then use the point correspondence between the observed images (or the motion sensors embedded in cameras) in order to update the camera parameters. This is similar to the idea of image mosaicking by estimating the inter-image homography transformation have been two image [11]. They can be accumulated across frames to provide estimates of the image-to-model transformation and camera parameter estimation. One of the problems associated with these family of algorithms is the fact that the error is accumulated over time and hence and eventually the estimated parameters start to diverge from the actual ones and there is not any way to overcome that issue, unless the calibration is being performed again.

In addition, in outdoor scenes and broadcast sport videos the use of calibration patterns can be considered impractical and landmark feature points are often rare and lines and curves are usually dominant visible features [2]. Therefore, some algorithms that do not require a calibration pattern are developed to match line features and find the image to model transformation [8] [10] [13]. Accurately finding lines in images has inherent difficulties compared to finding point landmarks, because it is involved in combining information across multiple pixels. In addition, lens distortion can make lines appear as curves and hence, detecting lines in distorted images becomes more complicated [9]. Accordingly, curved lines usually are more problematic and sometimes it might not be possible to find parametric fits for a curvilinear shape. Therefore, the accuracy of robustness of such methods are susceptible to the noisy extracted image features [4]. In summary, almost all calibration methods highly rely on the quality of the feature-point or line detections obtained from local corner or edge features and hence, the detection algorithms are affecting robustness, accuracy, and practicality of the calibration systems.

It is an object of the following to address at least one of the above-noted disadvantages.

SUMMARY

In one aspect, there is provided a method for calibrating and re-calibrating an imaging device, the image device comprising at least one varying intrinsic or extrinsic parameter value based on a view of 2D or 3D shapes and a 2D template therefor, the method comprising: receiving at least one image from the imaging device, wherein a planar surface with known geometry is observable from the at least one image; performing an initial estimation of a set of camera parameters for a given image frame; and performing a parameter adjustment operation between the at least one image and the template.

In an implementation, the method further comprises updating an adaptive world template to incorporate an additional stable point from the observed images to the template, the stable point corresponding to a detectable visual feature in the at least one image that is observable at a fixed location in a real-world coordinate system.

In an implementation, the parameter adjustment operation comprises at least one of: minimizing a dissimilarity between the template and the sequence of images; and maximizing similarities in at least one of: the camera's coordinate system and the template's coordinate system.

In another aspect, there is provided a method for calibrating and re-calibrating an imaging device, the image device comprising at least one varying intrinsic or extrinsic parameter value based on a view of at least one 2D or 3D shape with known dimensions, the method comprising: receiving at least one image from the imaging device, wherein a planar surface with known geometry is observable from the at least one image; and performing a direct estimation of the camera parameters using a geometric transformation estimator.

In other aspects, computer readable media and electronic devices comprising instructions for performing the above method are also provided.

BRIEF DESCRIPTION OF THE DRAWINGS

Embodiments will now be described by way of example only with reference to the appended drawings wherein:

FIG. 4(a) is an illustrative example of a real-world template corresponding to an ice rink in a hockey game;

FIG. 4(b) is an observed image frame take from a broadcast camera showing the ice hockey rink;

FIG. 4(c) illustrates a warped template applied to the camera's coordinate system;

FIG. 4(d) illustrates a warped image applied to the real-world template's coordinate system;

FIG. 5(a) illustrates an example set of points being matched from a pre-processed video to a video frame FIG. 5(b) illustrates an example set of points being matched from a pre-processed video to a template;

FIG. 7(a) illustrates an incorrect alignment;

FIG. 7(b) illustrates a correct alignment; and

DETAILED DESCRIPTION

Figure 1:
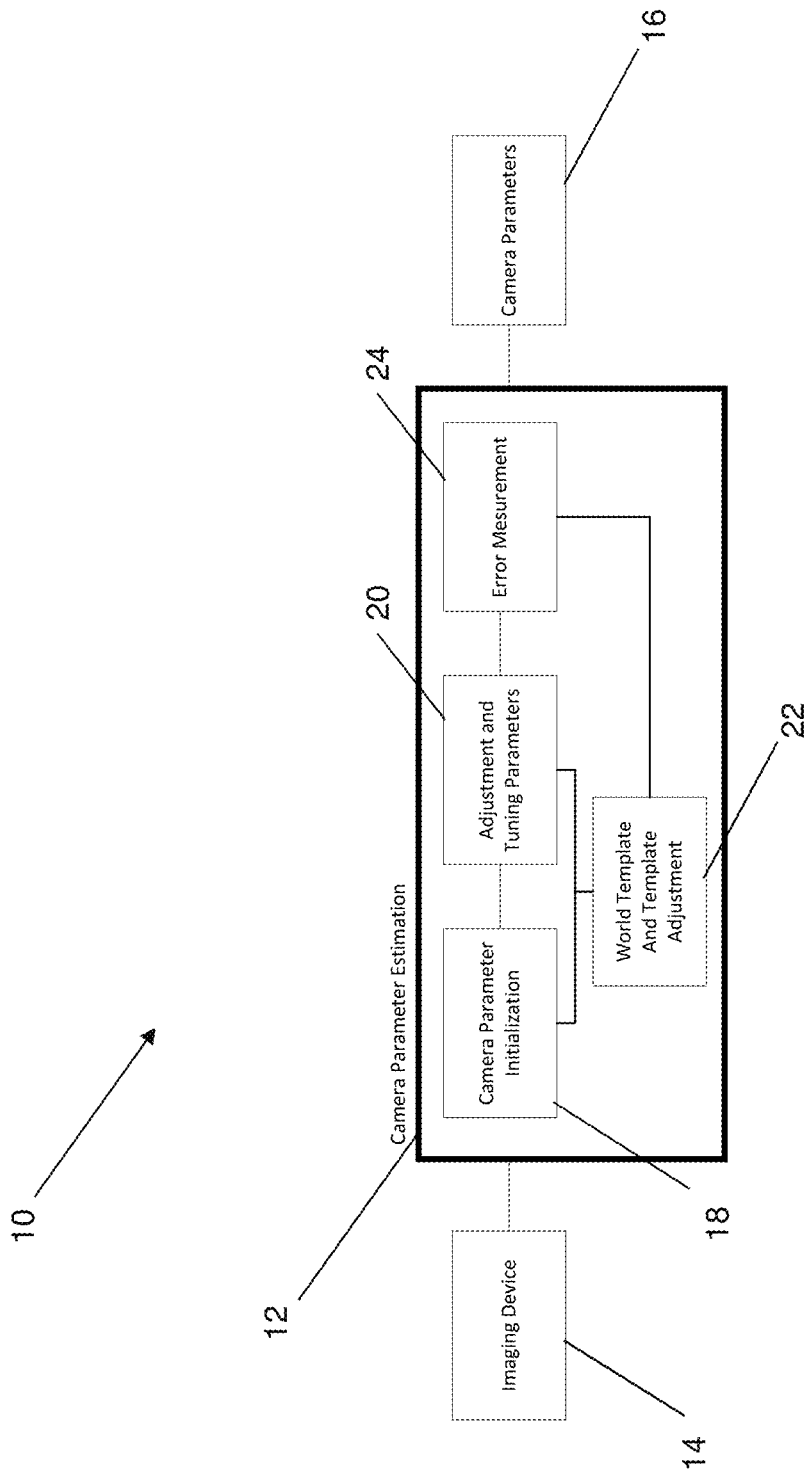
FIG. 1 is a schematic block diagram of a system for automated camera calibration and camera parameter estimation with a template of real world and known 2D or 3D geometry.

The following relates to methods and systems for iteratively estimating the ground plane, camera parameters and planar homography transformation in a sequence of images. The method includes receiving an image from an imaging device or a camera of 3D objects or 2D planes with known dimensions, referred to herein as "templates".

Two iterative camera parameter adjustment techniques are presented for optimizing the alignment between the image and the object template. The camera parameters and planar homography transform estimation are being updated using an iterative process at every image frame, by either considering point correspondence or by maximizing mutual information between the template target and the image frame.

It can be appreciated that although the principles set forth herein are described in the context of videos (or images) of sport fields using a regular camera device, the techniques can be applied to any other applications such as simultaneous localization and mapping in robotics applications and camera pose estimation with respect to planar objects with known dimensions to name a few.

The following includes estimating camera parameters in each single image, given the previously estimated camera parameters and a template of an object with known geometry. The technique uses a set of image-key-frames, obtained from previous observations in a sequence of images, taken by cameras with different parameters, to initialize the camera parameter estimation. Next, each image and an overhead template are used in a parameter adjustment process which minimizes the dissimilarity between them either in the template's or image's coordinate system.

Since this technique does not require any geometric parametrization of the scene either in the image's or the template's coordinate system, it can be used to align any image to a given template. The disclosed method is not based on direct image comparison and can compare similarity between an image and a sketched drawing of the scene, and hence, it is robust to color and illumination variation.

The method described herein uses mutual information of the overall image characteristics as a similarity measurement between the camera image and the template, in addition to the point-correspondences re-projection error in order to formulate and solve the camera calibration problem as an optimization problem. This is in contrast to at least some prior methods, which use error metrics in the optimization procedure which is a long range gradient computed from an error image, this being the difference between the camera image and the warped template image into the camera coordinate system. The method described herein also provides an automated procedure to initialize a set of camera parameters, and can transfer both the image and the template to an arbitrary common coordinate system and solve the optimization problem (as opposed to one-directional approaches previously seen).

The camera parameters are estimated by aligning a template and an edge image, using adjustment techniques, one based on point correspondence, and the other based on mutual information between the two images. This technique can be used to estimate camera parameters and planar homography transformation in long videos sequence-recorded by a non-static Pan, Tilt and Zoom (PTZ) camera with an automated procedure, and with multiple error measurement mechanisms, using two different parameter adjustment techniques.

The exemplary implementation described herein uses a sequence of images to continuously estimate camera parameters from a sports event video broadcast. Certain aspects are directed to a system for aligning sports event images and videos to a sport field template. The system includes an interface for inputting one or more images of the scene and methods for obtaining any one of: camera calibration, camera orientation and partial or full metric reconstruction of the scene. Illustrative embodiments are provided in the drawings.

FIG. 1 depicts a schematic block diagram of a process for automated camera calibration (10) and camera parameter estimation with a template of the real world and known 3D geometry (22). The initial parameter estimation (18) can be a fully automated process. The initial parameters are adjusted through an optimization process (20). The template can also be adjusted to correct some mismatches and wrong measurements, and to add additional information to the template (22) from the captured image which comes from an imaging device (14). Prior knowledge can be used in the error measurement mechanism (24) if it is available. The camera parameters (16) are numerical values of the intrinsic and extrinsic camera parameters or a subset of them.

Figure 2:
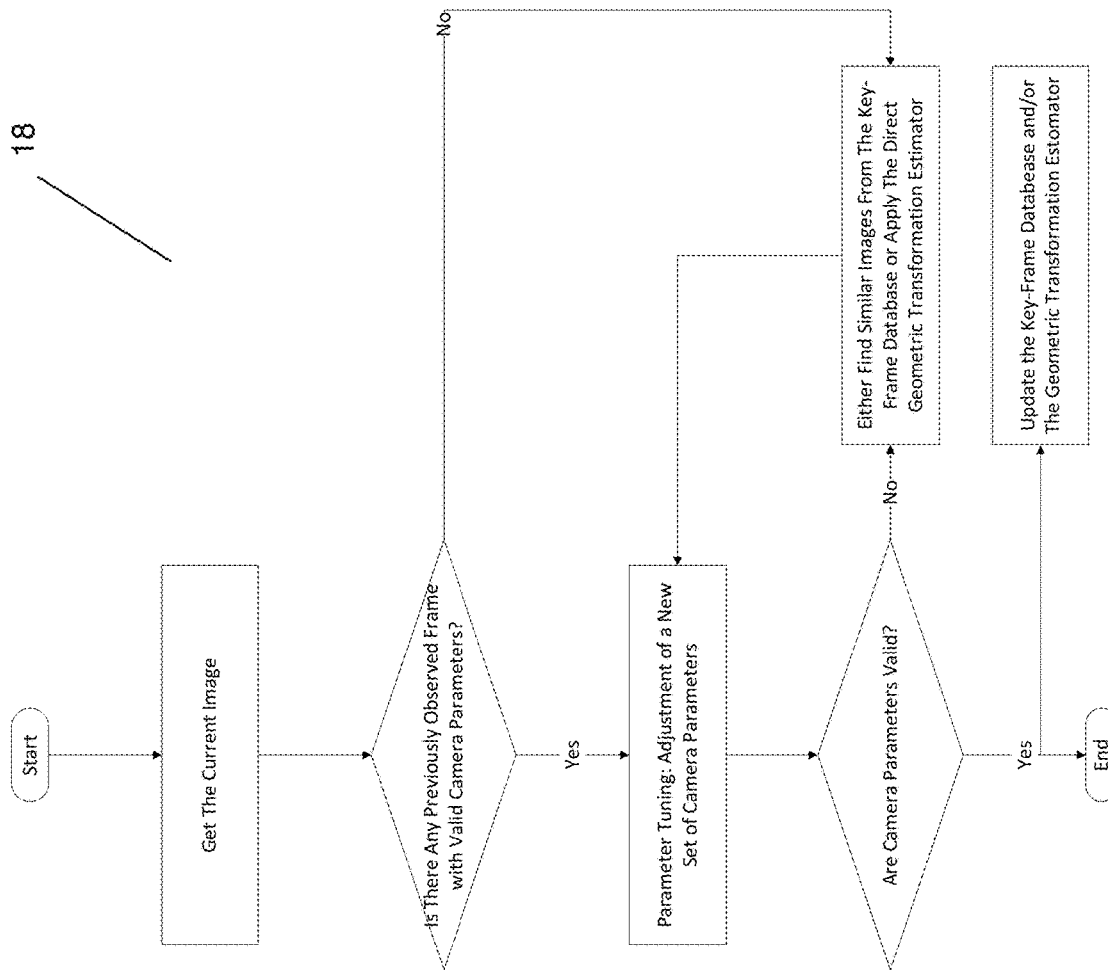
FIG. 2 is a flow chart illustrating computer executable instructions for an initialization and re-initialization process in order to initialize camera parameter adjustment.

FIG. 2 provides a flow diagram representing the initialization and re-initialization process that can be applied in order to initialize a camera parameter adjustment (18). Camera parameter initialization can be performed throughout an automated procedure in which either a database of key frames is used in order to determine the correct matching image frame to the current observation, or a geometric transformation estimator function is applied directly on the input image.

Figure 3:
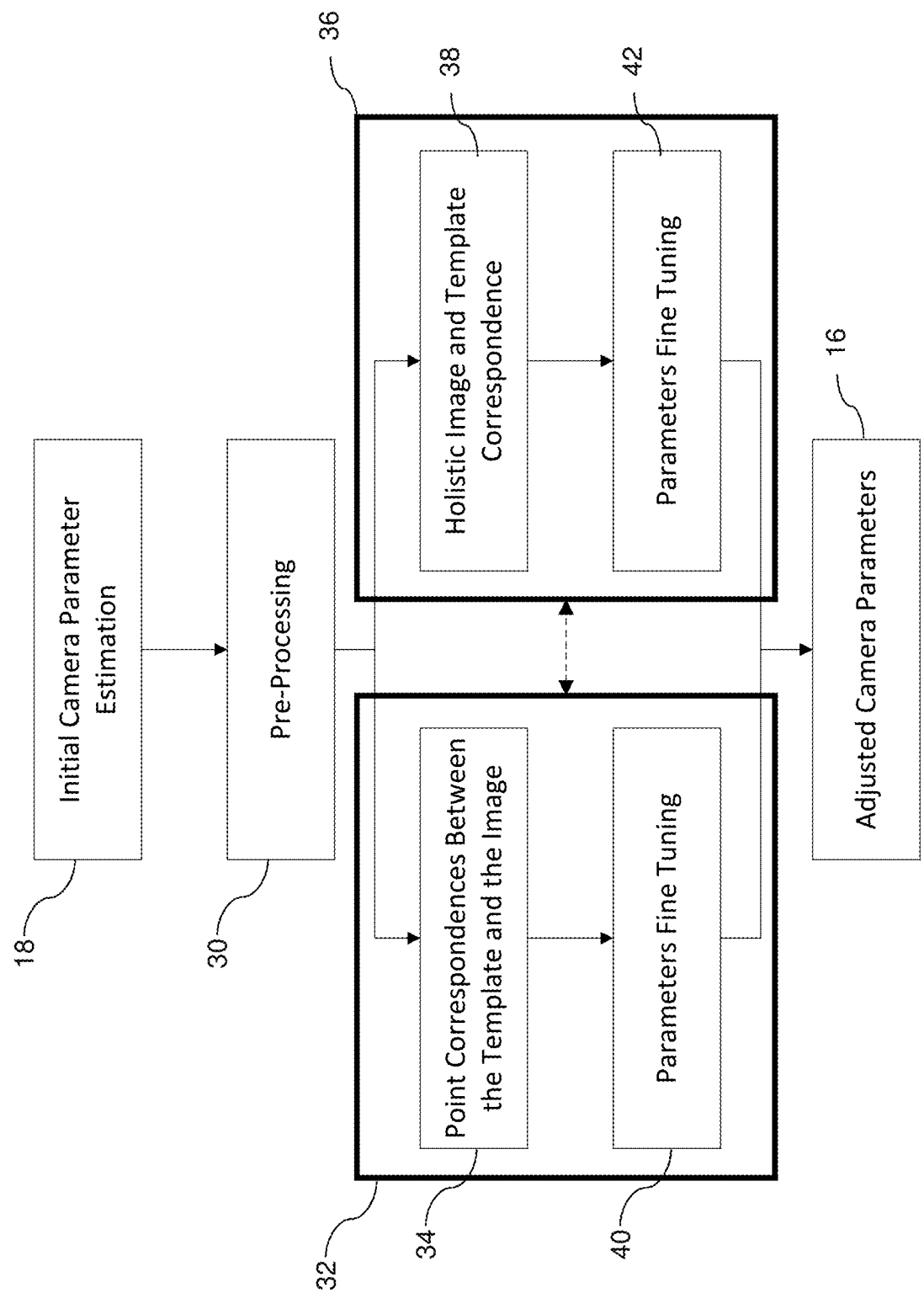
FIG. 3 is a flow chart illustrating computer executable instructions for performing camera parameter adjustments.

FIG. 3 provides a diagrammatic representation of the aforementioned camera parameter adjustment techniques. Different parameter adjustment methodologies are disclosed in order to minimize the error in the estimated parameters. Methods for point correspondence-based (32) and holistic image correspondence-based (36) camera calibration are utilized, and a method to combine them is illustrated in FIG. 3 and described below. Camera parameters are adjusted by optimizing using different error/similarity metrics (40) and (42). Exemplary error metrics/similarity are re-projection error and mutual information.

FIG. 4(a) provides an illustrative example of a real-world template corresponding to an ice rink in a hockey game, FIG. 4(b) provides an observed image frame taken from a broadcast camera showing the ice hockey rink, FIG. 4(c) shows a warped template applied to the camera's coordinate system, and FIG. 4(d) shows the warped image applied to the real-world template's coordinate system.

In FIG. 5, an example of a set of points is shown, which is matched from the pre-processed video in FIG. 5(a) to the frame, and in FIG. 5(b) to the template.

Figure 6:
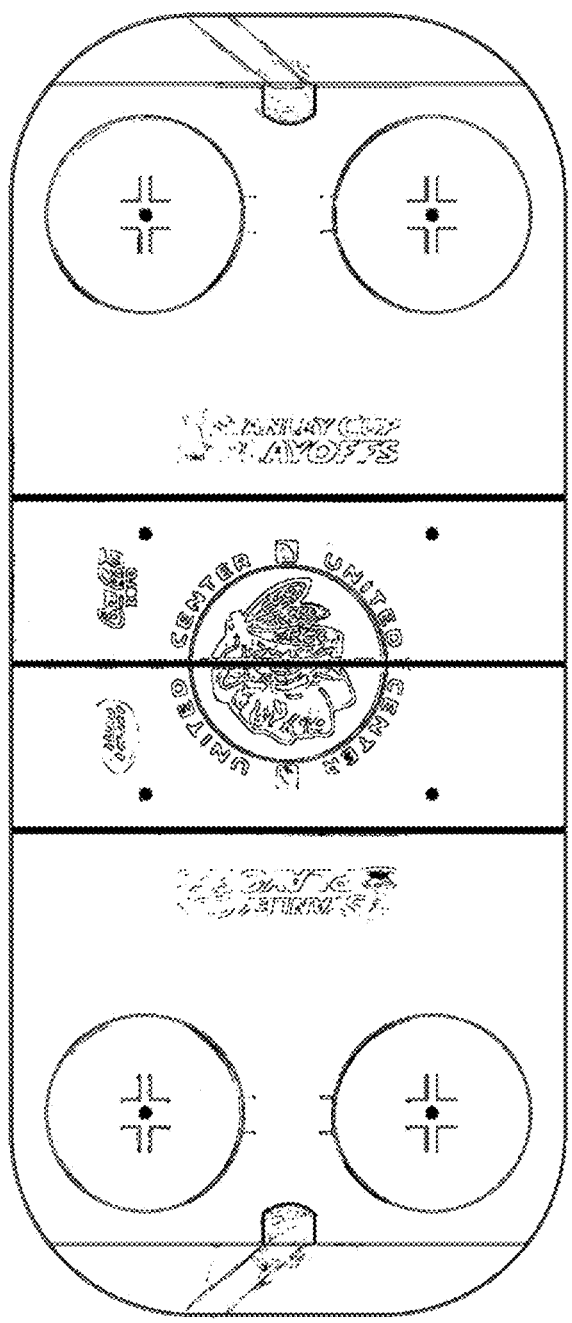
FIG. 6 is an example of a tracked template, after being updated with the additional information from the broadcast video.

FIG. 6 is an illustrative example of a tracked template, after being updated with the additional information from the broadcast video. The new data corresponds to landmarks specific to each sporting arena. This additional set of model points allows for better tracking under occlusion and motion blur.

FIGS. 7(a) and 7(b) provide illustrative examples of both visually incorrect and correct alignments. The mutual information scores, between the video frame and the warped template scores, where computed for the distributions of edge orientations and gradient curvature, at a resolution of 320 by 180 pixels, in the frame of reference of the broadcast video.

As noted above, the following principles relate to self-camera calibration and planar homography transformations estimation from observed images, and particularly to continuously re-calibrate and estimate camera parameters from a sequence of observed images. This system adaptively adjusts camera parameters given a new observed image to minimize the disparity between the re-projected image into the world coordinates system and the world template with known geometric properties.

In an implementation of the system, methods and algorithms are provided for adjusting camera parameters given an image and a template. The algorithms are directed to continuously adjusting and re-estimating camera parameters in a sequence of the images. In this implementation, the algorithm is based on matching the image to a template through an optimization procedure. In one aspect, the camera parameters are estimated by finding the correspondence between the image and the template using image features. In another aspect, the camera parameters are estimated by considering the whole image and the template without using image features and correspondences. In yet another aspect, both non-image feature and image feature based correspondences are considered together. In yet another aspect, the camera calibration systems uses a database of key-frames to initialize and re-initialize the camera parameters to be fine-tuned throughout an iterative optimization process.

The exemplary embodiment describes how the present camera parameter estimation works for broadcast sport videos. More specifically, the calibration methodology in the present application estimates the homography transformation of the planar objects and then the intrinsic and extrinsic camera parameters by aligning a planar template to the observed image of that template. The alignment of the image to the template is carried out by optimizing the mutual information between the transformed image and the transformed template in the same common space, as shown in FIGS. 7(a) and 7(b).

Upon determining an initial set of camera parameters, these may be used for subsequent computations of the camera parameters in the subsequent observed images and continuously estimating and re-calibrating the camera if the parameters are changing. This process is depicted in FIG. 1. The re-calibration is done by partitioning and aligning the planar patterns in the camera's image and the templates in order to maximize the mutual information between the two. In exemplary embodiments, the camera parameters and homography transformations may be estimated by aligning an image and a template. The present system is also useful for determining camera parameters for a multiple pair of cameras given that the camera parameters of one of them is known.

The formalization of the calibration problem follows the line of work proposed by Viola and Wells [17]. It is assumed that a broadcast video from a sporting event is the observed input for the calibration system. This video is treated as an ordered set of frames $\{I_0, I_1, \ldots, I_N\}$—where N can be unbounded. In order to estimate camera parameters and homography transformations, the initial template (e.g., a synthetically built template or an image obtained by an imaging device) of the demarcation lines and curves of the playing field is given. The template is referred to as $E_0$ and is shown in FIG. 4(a). The originally provided template may be updated automatically in order incorporate additional information such as stable points and landmarks that are obtained directly from the video feed and previous observations. This process is described below under the heading "Updating the Playing Field Model". Stable points can be considered detectable visual features which are observed at fixed locations in the real-world coordinate system, e.g., some constant and rigid objects in the scene.

Therefore, the modified template might be slightly different from the original playing field template, $E_t$, for next frames $I_t$ (t between 0 and N).

The problem is to find a geometric transformation $W_t$ that takes the image $I_t$ and warps it to the coordinate system of the template . . . , such that the field demarcation lines are aligned with those of the template, as illustrated in FIGS. 4(a) to 4(b). Applying the warping operation $W_t$ to an image, corresponds to constructing an image $I_{w_t}$ such that:

$$I_{w_t}(w_t(p)) = I(p) \tag{1}$$

where p is a point in video frame coordinates. Since digital video images are discretized into pixels, one can implicitly assume that some interpolation of pixels values is needed points that are not transformed exactly into integer pixel coordinates. Intuitively, the desired alignment transformation allows one to determine the area of the playing field that is covered by the field of view of the camera, enabling the precise localization of pixels from any frame to coordinates in the playing field. The objective is to find such a $W_t$ that maximizes an alignment function $f(I_{w_t}, E_t)$, which assigns higher values to more consistent alignments. It can be appreciated that the alignment can also be done by warping the template into the image coordinate system.

FIGS. 4(a) to 4(d) shows an example of the desired alignment between an image and a corresponding template. It is apparent that the template and the image are generated by two different modalities, which can make the problem of feature matching challenging. The template is usually a synthetic image or drawing (possibly hand-drawn) schematic of the real-world world playing field with the known measurements, while the image is generated by an imaging device (in this exemplary embodiment a broadcast camera showing some parts of the playing field). The template can also be an image obtained by an imaging device. Conventional image feature matching algorithms assume images belong to the same modality and usually include detecting corner features in order to establish the point correspondence between the two images. There are typically many detectable image features in images that contain textured regions, while a synthetic template has no texture and contains sparse information about the features that are present in the three-dimensional world. Therefore, in this case the conventional point-based image alignment technique may be impractical. Another issue which arises is to properly evaluate the correctness of the found alignment without using external information to the image itself and the template.

The system described herein sidesteps the issue of point feature matching and addresses the issue an alignment metric by taking a holistic approach to measure image similarity. To determine if an alignment is correct, a measure of consistency between the images and the warped template is required. A particular measure of consistency is mutual information [3] between features extracted from the image and the template. The system described herein is not limited to the use of mutual information and other measures of consistency may be used; e.g. Tsallis entropy, Jensen-Tsallis divergence, Jensen-Shannon Divergence, etc.

The following description illustrates in detail how this measure of consistency can be employed in a processing pipeline for finding $W_t$ for each video frame. In particular, this embodiment addresses the case where $W_t$ corresponds to planar geometric transformations; i.e. homography transformations between the template plane $E_t$ and the playing field plane obtained from the frame $I_t$. Even though it is focused on homography transformations, this embodiment shows how this approach may be extended to generalized 3D transformations providing the location of the broadcasting camera.

Planar Homograph Transformation

Let (u,v) denote the horizontal and vertical pixels coordinates for each pixel in the image $I_t$. Let (x,y) denote the metric coordinates of points in the template $E_t$. A homography transformation $W_t$ takes a point $p = [u\ v]^T$ from the video frame and maps it to a point $p_E = [x\ y]^T$. Using homogeneous coordinates, the homography transformation can be described by a 3×3 matrix $H_t$, and applying the transformation corresponds to the following expression:

$$w \begin{bmatrix} x \\ y \\ 1 \end{bmatrix} = H_t \begin{bmatrix} u \\ v \\ 1 \end{bmatrix} \tag{2}$$

where $H_t$ represents the homography transformation between the current image and the template. Therefore, the objective is to find the homography $H_t$ such that an "alignment metric" is maximized for each image frame at the time t:

$$H_t = \underset{H_t}{\arg\max}\, f(I_{W_t}, E_t) \tag{3}$$

where $W_t$ corresponds to the image warping associated to the homography transformation $H_t$.

Mutual Information Optimization Criterion

The system described herein uses mutual information as the alignment objective. This objective consists of comparing the consistency of the distribution of image features between $I_{w_t}$ and $E_t$.

Formally, let $\phi(p)=[\phi_1(p), \phi_2(p), \ldots, \phi_D(p)]$ be a D-dimensional feature vector for which each entry represents some quantity computed from the image at pixel location p. Example features include color intensities, image gradients and image gradient curvatures.

The empirical distribution of the values of the feature vector can be estimated. Let $P_E$ be the estimated empirical distribution of the feature vector values on the model E. Accordingly, define $P_{I_w}$ for the video frame image, warped into the model coordinate system. Let $P_{E,I_w}$ be the joint probability of feature vector values in the model and the warped video image. The entropy of a probability distribution (more specifically, the Shannon entropy) can be estimated as:

$$H\{P\}=E_{\phi\sim P}\{-\log_2 p(\phi)\} \quad (4)$$

This quantity is a measure of how many bits on average are needed to encode $\phi$ such that the minimum number of bits are used. Thus highly probable events are mapped to a low number of bits, and vice versa; except for events with zero probability which should not need to be encoded. Thus, the entropy of a probability distribution can be interpreted as the average amount of information, measured in bits, that one would obtain by observing the occurrence of some feature vector $\phi$. The mutual information between two distributions corresponds to the following quantity:

$$MI(P_1, P_2) = E_{\phi_1,\phi_2\sim P_{1,2}}\left\{-\log_2 \frac{p(\phi_1, \phi_2)}{p(\phi_1)p(\phi_2)}\right\} \quad (5)$$
$$= H\{P_1\} + H\{P_2\} - H\{P_1, P_2\}$$

This quantity represents how much information about the possible values of $\phi_1$ is obtained when observing an occurrence of $\phi_2$, and vice versa. Mutual information is maximized when the variables $\phi_1$ and $\phi_2$ are perfectly correlated. Given a model E and a frame I, the objective is to find the warping function $W_t$ such that the correlation between $$\phi_{I_{W_t}}(p)$$

and $\phi_E(p)$ is maximized, across all pixels locations p in the model coordinate system. This can be achieved by maximizing the mutual information between $P_E$ and $P_{I_w}$. Equation 6 summarizes the previous description to find the optimal warping function, $W^*_t$ as follows:

$$W^*_t = \underset{W_t}{\mathrm{argmax}}\, MI(P_E, P_{I_W}) \quad (6)$$

Parameter Initialization

To demonstrate the initialization and the re-initialization of the homography transformation between the real-world template and the observed image, FIG. 2 shows a schematic diagram of this procedure. In a semi-automated procedure, for the very first frame, $I_0$, it is assumed that the homography transformation between the image and the template is known either by manually identifying four pairs of corresponding points or pre-calibrating the camera. In the fully-automated calibration process, it is assumed that there is a key-frame database available, which has the similar images, and the camera parameters are estimated by taking the most similar key-frame to the first frame. Upon determination of the initial camera parameters, the whole re-calibration process continues automatically.

Estimating the Warping Transformation

Consider the homography estimation represented in equation (3). Although the objective function can be selected to be convex, it has been found to not be straightforward to find the optimal solution. Here we follow the assumption that the changes in the camera parameters are continuous the camera follows a continuous motion trajectory. Therefore, the homography transformation between the current image and the template, $H_t$, can be decomposed into two parts as follows:

$$H_t = H_{t-1}H_{t-1,t} \quad (7)$$

where $H_{t-1,t}$ represents the homography that transforms points from the playing field plane at frame t−1 to frame t, and $H_{t-1}$ is the homography transformation between the previously observed image and the template. Therefore, if an initial homography transformation is known one can obtain an initial estimate for the current homography $H_t$, by the use of (7) in order to solve the optimization problem in (3).

Pre-Processing

In order to estimate the homography transformation, the planar surface in the image at first is identified. Once a new frame is observed, at first, a color normalization is performed to make sure that the newly observed image is consistent with the previous ones in terms of color and illuminations. In this exemplary embodiment the planar surface is the ice rink and hence, it can be identified using a learned color model. The ice region is extracted from an image video based on the dominant color assumption. This is achieved by applying a threshold to the color histogram of the image and generate a region of interest (ROI) mask called $M_t$. In order to refine the mask a player detection algorithm may apply on the image and exclude the players and referees from the generated image mask. Since there are not any identifiable image landmark on the ice surface, the only reliable features are the lines and edges. Instead of using feature points detection, the edges are extracted from the image inside the masked region using a Canny operator [1]. Following the extracted edges from the image, for any image pixel $p=[u,v]^T\in M_t$, the first order gradient and curvatures are computed to represent characteristics of the detected edges. The image gradients combined with the curvatures can encode the structural properties of an image. Considering the image gradient is represented as $$\nabla I_t = \left[\frac{\partial I_t}{\partial u}, \frac{\partial I_t}{\partial v}\right]^T,$$

the image curvatures combined with the normal direction of the gradient is computed as follows:

$$K = -\frac{I_t}{\|\nabla I_t\|^3}\left[-\frac{\partial I_t}{\partial v}, \frac{\partial I_t}{\partial u}\right]\begin{bmatrix}\frac{\partial^2 I_t}{\partial u^2} & \frac{\partial^2 I_t}{\partial u \partial v} \\ \frac{\partial^2 I_t}{\partial v \partial u} & \frac{\partial^2 I_t}{\partial v^2}\end{bmatrix}\begin{bmatrix}-\frac{\partial I_t}{\partial v} \\ \frac{\partial I_t}{\partial u}\end{bmatrix} \in \mathrm{i}^2 \quad (8)$$

In order to keep computations minimal, only edge normals and curvatures are considered in this embodiment. It is possible to extend those edge characteristics to include higher order gradients to preserve more structural properties of the image.

Coarse Homography Estimation—Image to Image Transformations

Given the recursive homography estimation formulation in equation (7), the $H_{t-1,t}$ can be estimated by taking two images and finding the pairwise correspondence between feature points. Since the two images belong to the same image modality, i.e., both of them are generated by the same (or similar) imaging device. This is a similar problem to the stereo image correspondence and two different approaches exist to solve this problem. The first approach finds a set of features in one image and attempts to track them through subsequent image frames. In contrast, the second method tries to locate a set of features in each image frame and finds the correspondence between the detected features. The first approach is often characterized as feature tracking and is exemplified by the work of Tomasi and Kanade [15]. The second approach, often referred to as feature correspondence, can be implemented using several methods. Here a combination of both approaches is employed to find the point correspondences in the two images. Let $p_{I_{t-1}}$ denote the points on previously observed image, $I_{t-1}$, and $p_{I_t}$ denote the corresponding points on the current image. Then the homography between the two frames is estimated by minimizing the projection error between the corresponding points:

$$H_{t-1,t} = \arg\min_{H_{t-1,t}} \sum_{\substack{p_{I_t} \in M_t \\ p_{I_{t-1}} \in M_{t-1}}} dist(p_{I_{t-1}}, H_{t-1,t} p_{I_t}) \qquad (9)$$

In order to find a reliable set of point correspondences, each image is processed separately and key-points are determined by using the BRISK algorithm [12] and their descriptor is chosen to be the ORB, as described in [14]. Given the detected features and their locations, the correspondence is achieved by using the KLT algorithm and searching for corresponding points is them in local regions. In order to guarantee that the corresponding points belong to the same plane, the optimization in (9) is restricted to the points that are lying inside the playing field masks.

Given the point correspondence between the two images, $H_{t-1,t}$ is estimated using the RANSAC algorithm [6]. This step can be readily replaced by directly estimating homography between the two images using the mutual information of the images rather than using the pairwise point correspondence. Those skilled in the art will understand that this point-correspondence homography estimation can also be done with alternative key-point detection and matching methods.

Feature-Based Refinement

Once an image to image homograpy, $H_{t-1,t}$, is computed, there exists an initial estimate of the current image homography given equation (7). Because of the uncertainty in the feature point matching and noise in the computed features, this initial estimate is fine-tuned in order to correctly estimate the camera parameters and homography of the current frame. Since the image and the template do not share the same image characteristics, one can take edges (along with their directions and curvatures) in the current frame as the descriptive features and try to match them to the corresponding edge in the template, given the initial homography estimation, $H_t$, obtained by combining (9) and (7).

Let $p \Leftrightarrow P$ denote the point correspondence between a point in the image, $p$, and a point in the real-world template, $P$. Here one can adopt a variant of the Iterated Closest Points (ICP) algorithm [19] to estimate the homography. This is achieved by transforming the image to the template coordinates given the initial homography estimation, and finding the corresponding edges in the image and the template by moving along the edge normal direction. The correspondences are only considered between consistent edge normal directions and curvatures in order to remove outliers. FIGS. 5(a) and 5(b) demonstrates an example of point correspondence between the warped image and the world template. This results in a set of point correspondence between the image and the template, denoted by $C_t$. In each iteration of the ICP algorithm, the objective is to minimize the displacement between the image template points and their corresponding image points. Therefore, the homography transform is computed as follows:

$$H_t^* = \arg\min_{H_t} \sum_{p \Leftrightarrow P \in C_t} dist(P, H_t p) \qquad (10)$$

The optimization problem can be solved efficiently by adopting any gradient based optimization algorithm. Once the optimal solution is found, the current frame is transformed to the template's coordinate by the new homography transformation. The new homography is approved if it improves the mutual information between the transformed image and the template as explained by equation (6), otherwise it is rejected and the process continues to find another homography transform. The process of finding closest points is iteratively carried out until the convergence is achieved.

Mutual Information Based Refinement

The feature based refinement can provide reasonable results in the majority of situations. However, it only relies on computing the location of a sparse set of features and hence, it can be susceptible to accumulating errors from noisy location estimates and outliers. To mitigate this problem, the present technique can further adjust the camera parameters by directly optimizing the mutual information metric described in equation (6) using all of the pixels in the image.

Toward solving this optimization problem, the first step is to estimate the probability distribution functions, $\mathbb{P}_\varepsilon$ and $\mathbb{P}_{\mathcal{I}_W}$, and their joint probability distribution function. In this exemplary embodiment the non-parametric histograms are adopted to estimate the probability distribution functions. They can be replaced by other methods such as kernel density estimators, interpolated histograms, and other parametric algorithms. In this exemplary embodiment the feature vector representing each pixel, $\Phi$, is assumed to be a three dimensional vector which includes image gradients in two orthogonal directions and the magnitude of the gradient curvature vector. Given the estimated probability distribution functions, the optimization problem in equation (6) can be solved with gradient-based techniques. Here the gradient descent algorithm is adopted and the optimization is carried out by computing the gradients of the $MI(P_E, P_{I_w})$ with respect to the parameters of the warping transformation, $W_t$.

Updating the Playing Field Model

If there are some easily detectable features available on the image which are related to the other constant objects in real-world, but are not present on the template, it can be beneficial to take them into account in in the camera parameter estimation process to improve the robustness of the algorithm. One particular example of those image features are commercial advertisement logos and texts on playing fields, which are referred to herein as stable points as defined above. An example image is shown in FIGS. 4(a) to 4(d), representing those stable points. Because the stable points are always present at fixed locations in the real-world coordinate system, it is desirable to add their information from the video frames, $I_t$, to update the template, $E_{t+1}$, by adding the corresponding information. This process can be performed after computing the optimal warping function, $W_t$.

In order to update the template and add additional new stable points, the presently described system can treat the template as a grid and use the occupancy grid mapping approach [5]. An image edge presence probability can be assigned to each cell in the grid, in which $p_{edge}$ represents the probability of observing and an image edge in a particular cell, while $1-p_{edge}$ represents the probability of observing no image edge in that cell. Therefore, given the image edge occupancy grid, a new representative template, $E_{t+1}$, can be obtained by sampling the current occupancy grid. This template is being used to carry out re-calibration process in the following image frames. An example of the automatically updated template with added stable points is shown in FIG. 6.

Camera Parameter Re-Initialization and Recovery from Sudden Scene Changes

The system described herein can adopt the concept of video key-frames in order to relax the constraint for manual re-initialization of the camera calibration algorithm. Video key-frames are usually obtained by temporally segmenting videos into a subset of image frames which have common characteristics, in order to build a set of meaningful video segments that can be used for further processing. In this embodiment the common characteristic is to be visually similar, which implies that the images are captured from a similar viewing angle and capture similar parts of the scene.

This exemplary embodiment focuses on the use of color information and other video characteristics such as edges and luminance, to detect significant scene changes and build the key-frames database; and to retrieve the relevant key-frame to a new observation in the same scene. It will be appreciated that this particular key-frame extraction and matching method can be replaced by more sophisticated algorithms without departing from the principles expressed herein.

Assuming that the key-frame database is denoted by K, a matched key-frame, k*, to the currently observed image frame, $I_t$, can be obtained as follows:

$$k^* = \underset{k \in K}{\mathrm{argmin}}\, d(I_t, k) \tag{11}$$

where the $d(I_t, k)$ is a dissimilarity measurement between the two images. The image representation is taken to be the image color histogram in the HSV space with n number of bins, although any other feature space may be used such as color gradients. Here a variant of the video summarization algorithm by Girdhar and Dudek [7] is used to build the key-frame database.

Direct Camera Parameter Estimation with a Geometric Transformation Estimator

To avoid solving the optimization problem in equations (6), (9) and (10) every time a new image frame is observed, one can apply a direct geometric transformation estimator, g, so that a parameterized homography transformation can be estimated as:

$$H_t = g(I_t) \tag{12}$$

The geometric transformation estimator can be used to provide an estimate of the parameters of the camera to template warping function (e.g. a homography) directly from the observed image frame. This estimator also can either replace or be used in conjunction with the key-frame database to initialize and re-initialize the algorithms described herein.

The geometric transformation estimator is a mapping function, automatically learnt from either some example images with known homography transformation or images of the objects with the known templates using supervised or semi-supervised machine learning techniques. Assuming that a database of the image-transformation pairs, $\langle I_t, H_t \rangle$, exists. That database may be generated manually or automatically using the camera parameter estimation methods described herein. Using the database of the image-transformation pairs, the function $g(I_t)$ which takes as the image, $I_t$, as the input and is parametrized by a parameter vector is estimated. The desired output of the function is a set of parameters that produce a valid geometric transformation, from the image $I_t$ to the template, $E_t$, and vice versa. To obtain the parameters that produce the desired geometric transformation empirical or structural risk minimization in conjunction with gradient based methods are used; therefore the function $g(I_t)$ estimates the solutions to equations (6), (9) and (10).

An exemplary geometric transformation estimator can be a convolutional neural network that operates on directly on the images directly or indirectly on the salient visual features extracted from the images. In this exemplary embodiment, the homography transformation is parameterized by the standard 4-points parametrization technique and the mapping function, $g(I_t)$, is estimated by minimizing the disparity between the four points, i.e. the re-projection error.

Figure 8:
FIG. 8 illustrates an example of the correct alignment obtained using the direct geometric transformation estimator function on a broadcast hockey video.

In case a database of the image-transformation pairs, $\langle I_t, H \rangle$ does not exist, the geometric transformation estimator is modified to take the template as the input in addition to the image, $g(I_t, E_t)$. The function g is estimated by minimizing the disparity between the image and the template or maximizing the mutual information between the two. In this exemplary embodiment the geometric transformation estimator, g, is computed by optimizing the mutual information between the image and the template, as described in equation (6). The results of applying the direct geometric transformation estimator function on a broadcast hockey video is shown in FIG. 8.

In order to evaluate the accuracy of the presently described homography estimation method, the evaluation methodology proposed in the literature was followed. The evaluation dataset included basketball and hockey broadcast videos. The basketball test set includes 5969 frames of the size of 1280×720 and the hockey one contains 1000 frames with the size of 1920×1080. The ground-truth homographies are computed by manually annotating corresponding points between each video frame and a court/ice-rink template. The error is computed by measuring the average Euclidean distances between the points on the image transformed by the manually annotated homographies and ones transformed by the estimated homographies. The average error is ±13.26 cm (9.33 pixels) on hockey videos and ±10.56 cm (6.58 pixels) on basketball videos. We have conducted extensive tests on many different broadcasted hockey videos and our algorithm is capable of continuously tracking camera parameters for more than 120,000 frames of broadcast videos using a fully automated initialization and re-initialization process.

Estimation of the Camera Parameters from a Planar Homography

Assume that a 2D point in the camera coordinates is denoted by [x,y] and the a 3D point in real world is denoted by [X,Y,Z]. From the standard pinhole camera projection model, the relationship between the points in real-worlds and their projection in the image coordinates is written as follows:

$$\gamma \begin{bmatrix} x \\ y \\ 1 \end{bmatrix} = K[R\ t]\begin{bmatrix} X \\ Y \\ Z \\ 1 \end{bmatrix} \quad (12)$$

where $\gamma$ is an arbitrary scale factor. [R t] is called the extrinsic parameters in which R is a 3×3 rotation matrix and $t \in_i^3$ is the rotation vector, describe the rotation and translation which relates the world coordinate system to the camera coordinate system. K is called the camera intrinsic matrix, defined as:

$$K = \begin{bmatrix} f_x & s & c_x \\ 0 & f_y & c_y \\ 0 & 0 & 1 \end{bmatrix} \quad (13)$$

where $(c_x, c_y)$ are the coordinates of the principal point, $f_x$ and $f_y$ are the scale factors in image x and y axes, and s the parameter describing the skewness of the two image axes. The task of camera calibration is to determine the parameters of the transformation between an object in 3D space and the 2D image observed by the camera from visual information. Given the homography transformation between an image and the real world template, H, one can write the following equation:

$$w\begin{bmatrix} x \\ y \\ 1 \end{bmatrix} = H\begin{bmatrix} X \\ Y \\ 1 \end{bmatrix} = \lambda K[R\ t]\begin{bmatrix} X \\ Y \\ 0 \\ 1 \end{bmatrix} \quad (14)$$

where $\lambda$ is an arbitrary scalar and w is a scale factor. Let write $H=[h_1\ h_2\ h_3]$ and $R=[r_1\ r_2\ r_3]$. Therefore, we can write the following equation from (14):

$$[h_1 h_2 h_3] = \lambda K[r_1 r_2 t] \quad (15)$$

Since the columns of the rotation matrix are orthonormal, one can write the following:

$$h_1^T (K^{-1})^T K h_2 = 0$$

$$h_1^T (K^{-1})^T K h_2 = h_2^T (K^{-1})^T K h_2 \quad (16)$$

Given the two constraints in (16), one can solve for the intrinsic camera parameters, K, given homography transformations.

$$(K^{-1})^T K = \begin{bmatrix} \frac{1}{f_x^2} & -\frac{s}{f_x^2 f_y} & \frac{c_y s - c_x f_y}{f_x^2 f_y} \\ -\frac{s}{f_x^2 f_y} & \frac{s^2 + f_x^2}{f_x^2 f_y^2} & -\frac{s(c_y s - c_x f_y) + c_y f_x^2}{f_x^2 f_y^2} \\ \frac{c_y s - c_x f_y}{f_x^2 f_y} & -\frac{s(c_y s - c_x f_y) + c_y f_x^2}{f_x^2 f_y^2} & \frac{(c_y s - c_x f_y)^2 + c_y^2 f_x^2 + f_x^2 f_y^2}{f_x^2 f_y^2} \end{bmatrix} \quad (17)$$

Given the representation in (17) and the constraints in (16), there are 6 degrees of freedom and each homography transformation provides two constraints, therefore with at least three planar homographies the camera parameters can be determined uniquely up to a scale factor. If there are two planar homographies, one can impose the skewness parameter, s, to be equal to zero and add an additional constraint to (16). Given only one planar homography transformation, only two intrinsic parameters can be obtained, e.g. $f_c$ and $f_y$, assuming the s=0 and the $c_x$ and $c_y$ are known (e.g., at the center of the image). Once the intrinsic parameters are obtained, one can find the extrinsic parameters, rotation matrix and translation vector:

$$r_1 = \lambda K^{-1} h_1$$

$$r_2 = \lambda K^{-1} h_2$$

$$r_3 = r_1 \times r_2$$

$$t = \lambda K^{-1} h_3 \quad (18)$$

The rotation matrix, R, might not be orthonormal and hence, it should be orthogonalized using standard linear algebra techniques such as Singular Value Decomposition (SVD).

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, any component of or related to the system 10, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

[1] John Canny. A Computational Approach to Edge Detection. *Pattern Analysis and Machine Intelligence, IEEE Transactions on*, PAMI-8(6):679-698, 1986.

[2] G Peter K Carr, Iain Matthews. Method And System For Determining Camera Parameters From A Long Range Gradient Based On Alignment Differences In Non-Point Image Landmarks. Google Patents, 2013.

[3] Thomas M Cover, Joy A Thomas. *Elements of information theory*. John Wiley & Sons, 2012.

[4] Fréedréric Devernay, Olivier Faugeras. Straight Lines Have to Be Straight: Automatic Calibration and Removal of Distortion from Scenes of Structured Enviroments. *Mach. Vision Appl.*, 13(1):14-24, 2001.

[5] Alberto Elfes. Using occupancy grids for mobile robot perception and navigation. *Computer*, 22(6):46-57, 1989.

[6] Martin A. Fischler, Robert C. Bolles. Random Sample Consensus: A Paradigm for Model Fitting with Applications to Image Analysis and Automated Cartography. *Commun. ACM*, 24(6):381-395, 1981.

[7] Yogesh Girdhar, Gregory Dudek. Efficient on-line data summarization using extremum summaries. IEEE International Conference on Robotics and Automation (ICRA), 2012.

[8] A. Gupta, J. J. Little, R. J. Woodham. Using Line and Ellipse Features for Rectification of Broadcast Hockey Video. *Computer and Robot Vision (CRV)*, 2011 Canadian Conference on: 32-39, 2011.

[9] Richard Hartley, Andrew Zisserman. *Multiple view geometry in computer vision*. Cambridge university press, 2003.

[10] Jean-Bernard Hayet, Justus Piater. On-Line Rectification of Sport Sequences with Moving Cameras. Springer Berlin Heidelberg, 2007. URL http://dx.doi.org/10.1007/978-3-540-76631-5_70.

[11] R. Hess, A. Fern. Improved Video Registration using Non-Distinctive Local Image Features. *Computer Vision and Pattern Recognition*, 2007. CVPR '07. IEEE Conference on: 1-8, 2007.

[12] S. Leutenegger, M. Chli, R.Y. Siegwart. BRISK: Binary Robust invariant scalable keypoints. *Computer Vision (ICCV)*, 2011 IEEE International Conference on: 2548-2555, 2011.

[13] Kenji Okuma, James J Little, David G Lowe. Automatic rectification of long image sequences. Asian Conference on Computer Vision: 9, 2004.

[14] E. Rublee, V. Rabaud, K. Konolige, G. Bradski. ORB: An efficient alternative to SIFT or SURF. *Computer Vision (ICCV)*, 2011 IEEE International Conference on: 2564-2571, 2011.

[15] Carlo Tomasi, Takeo Kanade.*Detection and tracking of point features*. School of Computer Science, Carnegie Mellon Univ. Pittsburgh, 1991.

[16] R. Y. Tsai. A versatile camera calibration technique for high-accuracy 3D machine vision metrology using off-the-shelf TV cameras and lenses. *Robotics and Automation, IEEE Journal of*, 3(4):323-344, 1987.

[17] Paul Viola, William M Wells III. Alignment by maximization of mutual information. *International journal of computer vision*, 24(2):137-154, 1997.

[18] Zhengyou Zhang. A flexible new technique for camera calibration. *Pattern Analysis and Machine Intelligence, IEEE Transactions on*, 22(11):1330-1334, 2000.

[19] Zhengyou Zhang. Iterative point matching for registration of free-form curves and surfaces. *International Journal of Computer Vision*, 13(2):119-152, 1994. URL http://dx.doi.org/10.1007/BF01427149.

[20] Yunfang Zhu, Shuiping Li, Xin Du. Parameter calibration method and apparatus. Google Patents, 2014 (WO 2013/182080).

The invention claimed is:

1. A method for calibrating and re-calibrating an imaging device, camera parameters for the imaging device comprising at least one varying intrinsic or extrinsic parameter value based on a view of 2D or 3D shapes of an object with known geometry and a 2D template of the object, the method comprising:
   receiving at least one image from the imaging device, wherein a planar surface of the object with known geometry is observable from the received image;
   performing an initial estimation of a set of camera parameters for a given image frame directly from the received image without using predefined image features to establish point correspondences, by instead using at least one of: i) a key frame database generated from previous observations in a sequence of images by querying the key frame database to find similar images to the given image frame with known camera parameters, and ii) a geometric transformation estimator comprising a mapping function that estimates the parameters of the camera directly from the received image by applying one or more operations of the mapping function on image pixels of the received image to generate a mapping between all pixels of the received image and the template of the object or the camera parameters; and
   performing a camera parameter adjustment operation by adjusting the camera parameters for the imaging device using the received image and the template of the object.

2. The method of claim 1, further comprising updating an adaptive world template to incorporate an additional stable point from the observed images to the template of the object, the stable point corresponding to a detectable visual feature in the at least one image that is observable at a fixed location in a real-world coordinate system.

3. The method of claim 1, wherein the camera parameter adjustment operation comprises at least one of:
   minimizing a dissimilarity between the template and a sequence of images; and
   maximizing similarities in at least one of: the camera's coordinate system and the template's coordinate system.

4. The method of claim 1, further comprising adjusting the camera parameters in a next image frame given previously estimated parameters and a refinement procedure.

5. The method of claim 1, further comprising adjusting the camera parameters by maximizing mutual information between transformed images and the template or between a transformed template and the images.

6. The method of claim 1, further comprising adjusting camera parameters by minimizing a disparity between image points and a template pattern using a plurality of pixel values.

7. The method of claim 1, further comprising generating a real-world template update to incorporate a stable point in the original template of the object based on the observation of static patterns in previous images.

8. The method of claim 1, further comprising using an update real-world template to further refine and adjust the camera parameters.

9. The method of claim 1, further comprising providing an interface to receive human knowledge.

10. The method of claim 6, further comprising using line directions and curvatures in adjusting the camera parameters.

11. The method of claim 5, further comprising a pre-processing operation to compute probabilities of an image pixel to be an image edge.

12. A method for calibrating and re-calibrating an imaging device, camera parameters for the imaging device comprising at least one varying intrinsic or extrinsic parameter value based on a view of at least one 2D or 3D shape of an object with known geometry, the method comprising:
   receiving an image from the imaging device, wherein a planar surface of the object with known geometry is observable from the received image; and
   performing an estimation of the camera parameters directly from the received image without using pre-defined image features to identify key points in the received image to establish point correspondences of the received image to obtain the estimation, by instead directly applying a geometric transformation estimator to the received image, the geometric transformation estimator comprising a mapping function previously learnt from objects having a known geometric transformation or a known template.

13. The method of claim 12, further comprising obtaining the geometric transformation estimator by using at least one of:
   at least one pair of the image and the corresponding template; and
   at least one pair of the image and the corresponding homography transformation of at least one planar object.

14. The method of claim 13, further comprising:
   receiving a view of at least one 2D or 3D shape of the object with known geometry and a 2D template of the object;
   wherein a parameter adjustment operation for the geometric transformation estimator comprises at least one of:
   minimizing a dissimilarity between the template and the image; and
   maximizing similarities in at least one of: the camera's coordinate system and the template's coordinate system.

15. The method of claim 12, further comprising adjusting parameters for the geometric transformation estimator by maximizing mutual information between transformed images and the template or between a transformed template and the images.

16. A non-transitory computer readable medium comprising computer executable instructions for calibrating and re-calibrating an imaging device, camera parameters for the imaging device comprising at least one varying intrinsic or extrinsic parameter value based on a view of 2D or 3D shapes of an object with known geometry and a 2D template of the object, comprising instructions for:
   receiving at least one image from the imaging device, wherein a planar surface of the object with known geometry is observable from the received image;
   performing an initial estimation of a set of camera parameters for a given image frame directly from the received image without using predefined image features to establish point correspondences, by instead using at least one of: i) a key frame database generated from previous observations in a sequence of images by querying the key frame database to find similar images to the given image frame with known camera parameters, and ii) a geometric transformation estimator comprising a mapping function that estimates the parameters of the camera directly from the received image by applying one or more operations of the mapping function on image pixels of the received image to generate a mapping between all pixels of the received image and the template of the object or the camera parameters; and
   performing a camera parameter adjustment operation by adjusting the camera parameters for the imaging device using the received image and the template of the object.

17. A non-transitory computer readable medium comprising computer executable instructions for calibrating and re-calibrating an imaging device, camera parameters for the imaging device comprising at least one varying intrinsic or extrinsic parameter value based on a view of at least one 2D or 3D shape of an object with known geometry, comprising instructions for:
   receiving an image from the imaging device, wherein a planar surface of the object with known geometry is observable from the received image; and
   performing an estimation of the camera parameters directly from the received image without using pre-defined image features to identify key points in the received image to establish point correspondences of the received image to obtain the estimation, by instead directly applying a geometric transformation estimator to the received image, the geometric transformation estimator comprising a mapping function previously learnt from objects having a known geometric transformation or a known template.

18. An electronic device comprising a processor and memory, the memory comprising computer executable instructions for calibrating and re-calibrating an imaging device, camera parameters for the imaging device comprising at least one varying intrinsic or extrinsic parameter value based on a view of 2D or 3D shapes of an object with known geometry and a 2D template of the object, comprising instructions for:

receiving at least one image from the imaging device, wherein a planar surface of the object with known geometry is observable from the received image;

performing an initial estimation of a set of camera parameters for a given image frame directly from the received image without using predefined image features to establish point correspondences, by instead using at least one of: i) a key frame database generated from previous observations in a sequence of images by querying the key frame database to find similar images to the given image frame with known camera parameters, and ii) a geometric transformation estimator comprising a mapping function that estimates the parameters of the camera directly from the received image by applying one or more operations of the mapping function on image pixels of the received image to generate a mapping between all pixels of the received image and the template of the object or the camera parameters; and performing a camera parameter adjustment operation by adjusting the camera parameters for the imaging device using the received image and the template of the object.

19. The electronic device of claim 18, coupled to the imaging device.

20. The electronic device of claim 18, incorporated into the imaging device.

21. An electronic device comprising a processor and memory, the memory comprising computer executable instructions for calibrating and re-calibrating an imaging device, camera parameters for the imaging device comprising at least one varying intrinsic or extrinsic parameter value based on a view of at least one 2D or 3D shape of an object with known geometry, comprising instructions for:

receiving an image from the imaging device, wherein a planar surface of the object with known geometry is observable from the received image; and performing an estimation of the camera parameters directly from the received image without using predefined image features to identify key points in the received image to establish point correspondences of the received image to obtain the estimation, by instead directly applying a geometric transformation estimator to the received image, the geometric transformation estimator comprising a mapping function previously learnt from objects having a known geometric transformation or a known template.

22. The method of claim 1, wherein the geometric transformation estimator provides an estimate of the parameters of the camera to a template warping function directly from the received image.

23. The device of claim 18, wherein the geometric transformation estimator provides an estimate of the parameters of the camera to a template warping function directly from the received image.

24. The method of claim 1, wherein the geometric transformation estimator is a mapping function, automatically learnt from either images with a known homography transformation or images of one or more objects with a known template using supervised or semi-supervised machine learning techniques.

25. The device of claim 18, wherein the geometric transformation estimator is a mapping function, automatically learnt from either images with a known homography transformation or images of one or more objects with a known template using supervised or semi-supervised machine learning techniques.

26. The method of claim 12, wherein the geometric transformation estimator provides an estimate of the parameters of the camera to a template warping function directly from the received image.

27. The device of claim 21, wherein the geometric transformation estimator provides an estimate of the parameters of the camera to a template warping function directly from the received image.

28. The method of claim 12, wherein the geometric transformation estimator is a mapping function, automatically learnt from either images with a known homography transformation or images of one or more objects with a known template using supervised or semi-supervised machine learning techniques.

29. The device of claim 21, wherein the geometric transformation estimator is a mapping function, automatically learnt from either images with a known homography transformation or images of one or more objects with a known template using supervised or semi-supervised machine learning techniques.

* * * * *